Oct. 1, 1963  J. H. B. GEORGE  3,105,740
PROCESS FOR PURIFYING CAUSTIC SODA AND CAUSTIC POTASH
Filed Dec. 31, 1962
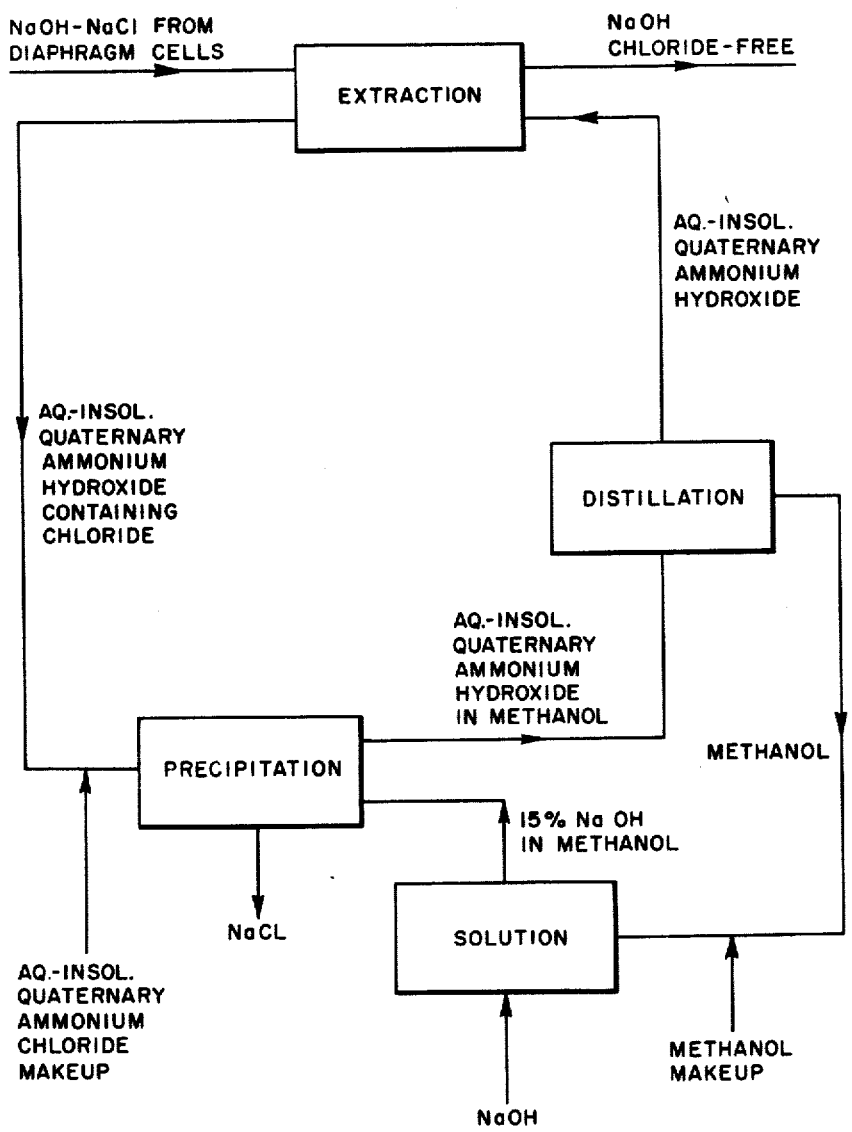
INVENTOR.
James H. B. George
BY United States Patent Office 3,105,740
Patented Oct. 1, 1963

3,105,740
PROCESS FOR PURIFYING CAUSTIC SODA
AND CAUSTIC POTASH
James H. B. George, Cambridge, Mass., assignor to Arthur D. Little, Inc., Cambridge, Mass., a corporation of Massachusetts
Filed Dec. 31, 1962, Ser. No. 248,647
13 Claims. (Cl. 23—184)

This invention relates to the removal of chloride impurities from caustic soda or caustic potash. More particularly it relates to the treatment of mixtures of sodium or potassium hydroxide and sodium or potassium chloride by a process the net effect of which is to convert all the chloride to hydroxide, thereby providing a product which contains all the original sodium or potassium in the form of the hydroxide.

Gross separation of sodium or potassium chloride from mixtures thereof with sodium or potassium hydroxide can be easily performed by virtue of solubility differences. Removal of small amounts (say under 5%) of sodium or potassium chloride from admixture with the hydroxide is not easy, however, and removal becomes increasingly difficult with decrease in the chloride percentage.

This problem is especially acute in the purification of caustic soda or potash produced in diaphragm cells. There the caustic solution product contains about one-half to one percent of the chloride in an aqueous solution of about 50% caustic (i.e. about equal parts caustic and water). For most purposes, this amount of chloride is of little or no significance. For some uses, however, such as in the rayon industry, a chloride-free caustic is required for satisfactory operation. The requirement for purity is in fact becoming increasingly important for other purposes as well.

Substantially chloride-free caustic soda and caustic potash are produced in mercury cells. These, however, are somewhat more expensive to install than are diaphragm cells. Both processes are, of course, electrochemical, and together they account for the major part of caustic production. Presently-known processes for purifying diaphragm caustic are relatively costly and still do not provide a truly chloride-free product.

A simple and inexpensive process for effective purification of diaphragm caustic would therefore be of marked advantage to the diaphragm caustic industry, as it would permit the industry to maintain a favorable competitive position in the field of pure caustic production and would avoid the necessity of scrapping and replacing otherwise perfectly good and expensive apparatus.

It is, therefore, a principal object of this invention to provide a process which will accomplish such purification, and which more generally is adapted to the purification of aqueous solutions of mixed sodium hydroxide-sodium chloride or mixed potassium hydroxide-potassium chloride. Other objects include the accomplishment of this purification in a process whereby the purifying reactants are recycled and there is no significant consumption of expensive reactants, and wherein conventional equipment may be used effectively.

The process of this invention comprises, briefly, the steps of treating an aqueous caustic soda or caustic potash solution, containing the corresponding alkali metal chloride, with the hydroxide of a water insoluble liquid quaternary ammonium compound, whereby the alkali metal chloride is converted to hydroxide and the quaternary hydroxide to the corresponding chloride. The organic phase, containing the latter chloride, is then separated and equilibrated with a solution of sodium or potassium hydroxide in methanol or other suitable alcohol. The alkali metal chloride is thereupon formed, and as it is insoluble in the alcohol it precipitates, while the reformed quaternary hydroxide is recycled into the first-mentioned step. Methanol is removed from the quaternary by any appropriate procedure, such as washing or distillation, and is recycled if desired.

The quaternary ammonium compound is a liquid, and may be represented by the formula $R_4NX$, wherein X is either Cl or OH, depending upon the position of the quaternary in the process. In any event the quaternary ammonium compound is aqueous-insoluble—i.e. it is insoluble, or practically so, in water and in the aqueous solutions of sodium or potassium hydroxide, sodium or potassium chloride, or mixtures thereof, encountered in the process. Suitable examples of the quaternary compounds are those wherein $R_4N$— is tricaprylyl methyl ammonium, or distearyl dimethyl ammonium.

The R's may be alike or different, and they comprise at least two alkyl groups of at least 8 carbon atoms each. They may include aryl or cyclo-alkyl groups. The total number of carbon atoms in the $R_4$ radical is at least 18.

As a practical matter, methanol is the preferred alcohol for use as a solvent for the sodium or potassium hydroxide. However, others of the lower aliphatic alcohols can be used, such as ethyl, propyl, isopropyl, etc., and others in which sodium or potassium hydroxide is soluble. The criterion here is that of solubility.

The hydroxide added in solution in the methanol may be either sodium or potassium hydroxide. If the former is used, sodium chloride will be precipitated and removed; if potassium hydroxide is used, potassium chloride will be similarly precipitated and removed. Owing to the greater cost of potassium hydroxide, there is ordinarily nothing to be gained by its use. However, the solubility of potassium hydroxide in certain alcohols is not identical with that of sodium hydroxide, and such solubility differences, either in the alcohols or elsewhere in the system, may indicate a preference for potassium hydroxide in some instances. The use of still other alkali metal hydroxides is possible in this connection, but it is not attractive on a commercial basis.

This invention will now be described in more detail in connection with the accompanying flow sheet, which is to be considered as illustrative rather than limiting. This flow sheet shows a typical application of the process in the removal of aqueous chloride from aqueous caustic soda from diaphragm cells. Exactly the same procedure is used in treating aqueous caustic potash containing KCl, in which case the feed to the extraction step, in the flow sheet, would be shown as "KOH-KCl from diaphragm cells" and the product from that step as "KOH chloride-free." For the sake of brevity and conciseness, however, this invention will now be described, in connection with the accompanying flow sheet, in respect to diaphragm caustic soda treatment. It is of course understood that other aqueous NaOH-NaCl or KOH-KCl solutions can be similarly treated.

A diaphragm caustic aqueous solution from which the NaCl has been removed, as by conventional cooling of the solution, to the customary level of ½ to 1%, and which contains about 50% NaOH (balance being water), is extracted with the liquid aqueous-insoluble qaternary ammonium hydroxide $R_4NOH$ containing the $R_4N$— radical, of the type already described above. A counter-current extraction, preferably multi-stage, of between 3 and 5 parts aqueous caustic solution to one part $R_4NOH$, is sufficient to reduce the NaCl to about 0.005%, thereby producing a substantially chloride-free aqueous solution of NaOH. The amount of NaCl in the product can of course be varied in accordance with the number of extractions and the ratio of $R_4NOH$ used in carrying them out. Adequate agitation is provided during extraction, as the two liquids are immiscible. The reaction in the extraction process is $$NaCl + R_4NOH \rightarrow R_4NCl + NaOH \qquad (1)$$

Hence the aqueous-insoluble quaternary ammonium hydroxide leaving the extraction step contains a small amount of quaternary ammonium chloride. The amount will depend upon the ratio of extractant to feed and the proportion of chloride in the feed. It will conveniently be in the range of 1 to 5%, although it may be higher.

Thus it is evident that the amount of sodium in the chloride-free caustic leaving the extraction process as NaOH will be substantially identical with the amount which was fed into the extraction process as NaOH and NaCl.

The chloride-containing quaternary ammonium hydroxide leaving the extraction step is regenerated for use in the extraction step by treatment with a solution of NaOH or KOH in methanol or other suitable alcohol, as already referred to. A solution of 15% NaOH in methanol is usually the most satisfactory, from a practical point of view. The quaternary ammonium chloride is thereupon converted back to the hydroxide, thus:

$$R_4NCl + NaOH \rightarrow R_4NOH + NaCl \qquad (2)$$

If KOH instead of NaOH is used the reaction is:

$$R_4NCl + KOH \rightarrow R_4NOH + KCl \qquad (3)$$

Inasmuch as this reaction takes place in a one-phase liquid in which NaCl (or KCl) is insoluble, the latter precipitates and is removed by any conventional means. The chloride-free liquid is then subjected to distillation or other appropriate process for removal of the methanol, after which it is ready for use as the extractant in the initial step of extracting the diaphragm caustic solution.

In carrying out the precipitation step, the amount of NaOH or KOH in the alcohol must be at least enough to precipitate all the chloride. A small excess is preferred, except that if KOH is definitely undesirable in the purified NaOH product (ordinarily, small amounts are immaterial) its use in chloride precipitation should be avoided.

The methanol removed as aforesaid is preferably recycled by mixing with make-up NaOH or KOH to provide the solution for regenerating the chloride-containing quaternary ammonium hydroxide.

Aqueous-insoluble quaternary ammonium compounds of the type herein referred to are commonly available commercially as their chloride. These can be converted to the corresponding hydroxides by treatment with NaOH in known manner—e.g. NaOH in methanol. In the process of the present invention, the quaternary ammonium compound is not used up, as it circulates repeatedly through the process. Any losses however may be taken care of by adding the aqueous-insoluble quaternary ammonium compound, conveniently as chloride, to the extractant liquid before the step of precipitating alkali metal chloride therefrom.

This is a continuation-in-part of my copending application Serial No. 230,064, filed October 12, 1962, now abandoned.

I claim:

1. A process for removal of chloride ions from aqueous solution of the hydroxide and the chloride of an alkali metal, which comprises mixing said solution with a liquid quaternary ammonium hydroxide $R_4NOH$ immiscible with said solution, whereby said chloride is converted to the hydroxide by the reaction $$R_4NOH + MCl \rightarrow MOH + R_4NCl$$

wherein M represents the alkali metal, and $R_4$ consists of at least two alkyl groups of at least 8 carbon atoms each, and the total number of carbon atoms in $R_4$ is at least 18, and then separating said quaternary ammonium chloride from the mixture; the alkali metal being a member of the group consisting of sodium and potassium.

2. A process according to claim 1, further characterized in that said quaternary ammonium chloride is reconverted to its hydroxide by reaction with an alkali metal hydroxide and then recirculated to the first mixing step.

3. A process according to claim 1 wherein said alkali metal is sodium.

4. A process according to claim 1 wherein said alkali metal is potassium.

5. A process for removal of chloride ions from aqueous solution of the hydroxide and the chloride of an alkali metal, which comprises mixing said solution with a liquid quaternary ammonium hydroxide $R_4NOH$ immiscible with said solution, whereby said chloride is converted to the hydroxide by the reaction $$R_4NOH + MCl \rightarrow MOH + R_4NCl$$

wherein M represents the alkali metal, and $R_4$ consists of at least two alkyl groups of at least 8 carbon atoms each, and the total number of carbon atoms in $R_4$ is at least 18, separating from the mixture said quaternary ammonium hydroxide and its chloride and mixing them with a solution of an alkali metal hydroxide in an alcohol, said latter solution and said quaternary ammonium hydroxide and its chloride being miscible to form a single phase, whereby alkali metal chloride is precipitated by reaction of the alkali metal hydroxide with the quaternary ammonium chloride and the latter is converted to the hydroxide, and then recirculating all the quaternary ammonium hydroxide to the first mixing step; alkali metal being a member of the group consisting of sodium and potassium.

6. A process according to claim 5 wherein said alcohol is methanol.

7. A process according to claim 5 wherein said alkali metal is sodium.

8. A process according to claim 5 wherein said alkali metal is potassium.

9. A process according to claim 5 wherein said quaternary ammonium hydroxide is distaryl dimethyl ammonium hydroxide.

10. A process according to claim 5 wherein said quaternary ammonium hydroxide is distearyl dimethyl ammonium hydroxide.

11. A process for removal of chloride ions from diaphragm caustic, which comprises mixing said diaphragm caustic with a liquid quaternary ammonium hydroxide $R_4NOH$ immiscible with said diaphragm caustic whereby said chloride ions are reacted with said quaternary hydroxide as follows:

$$R_4NOH + Cl^- \rightarrow OH^- + R_4NCl$$

separating from the mixture the quaternary ammonium chloride and mixing it with a solution of an alkali metal hydroxide MOH in an alcohol to form a single phase solution, separating out the insoluble alkali metal chloride which is formed by the reaction $$R_4NCl + MOH \rightarrow MCl + R_4NOH$$

and recirculating the quaternary ammonium hydroxide to the first mixing step, said $R_4$ consisting of at least two alkyl groups of at least 8 carbon atoms each, the total number of carbon atoms in $R_4$ being at least 18.

12. A process in accordance with claim 11 wherein MOH is sodium hydroxide.

13. A process for removal of chloride ions from aqueous solution of potassium hydroxide contaminated with potassium chloride in said solution, which comprises mixing said solution with a liquid quaternary ammonium hydroxide $R_4NOH$ immiscible with said solution whereby said chloride ions are reacted with said quaternary hydroxide as follows:

$$R_4NOH + Cl^- \rightarrow OH^- + R_4NCl$$

separating from the mixture the quaternary ammonium chloride and mixing it with a solution of an alkali metal hydroxide MOH in an alcohol to form a single phase solution, separating out the insoluble alkali metal chloride which is formed by the reaction $$R_4NCl + MOH \rightarrow MCl + R_4NOH$$

and recirculating the quaternary ammonium hydroxide to first mixing step, said $R_4$ consisting of at least two alkyl groups of at least 8 carbon atoms each, the total number of carbon atoms in $R_4$ being at least 18.

References Cited in the file of this patent

UNITED STATES PATENTS

| 2,418,372 | Smith | Apr. 1, 1947 |
| 2,743,165 | Miller et al. | Apr. 24, 1956 |
| 2,789,036 | Tillman | Apr. 16, 1957 |

UNITED STATES PATENT OFFICE
CERTIFICATE OF CORRECTION

Patent No. 3,105,740                      October 1, 1963

James H. B. George

It is hereby certified that error appears in the above numbered patent requiring correction and that the said Letters Patent should read as corrected below.

Column 3, line 51, for "chloride" read -- chlorides --; column 4, line 42, for "distaryl dimethyl" read -- tricaprylyl methyl --.

Signed and sealed this 14th day of April 1964.

(SEAL)
Attest:
ERNEST W. SWIDER                    EDWARD J. BRENNER

Attesting Officer                      Commissioner of Patents